US006998987B2

(12) United States Patent
Lin

(10) Patent No.: US 6,998,987 B2
(45) Date of Patent: Feb. 14, 2006

(54) INTEGRATED RFID AND VIDEO TRACKING SYSTEM

(75) Inventor: Yun-Ting Lin, Ossining, NY (US)

(73) Assignee: Activseye, Inc., Briarcliff Manor, NY (US)

(*) Notice: Subject to any disclaimer, the term of this patent is extended or adjusted under 35 U.S.C. 154(b) by 69 days.

(21) Appl. No.: 10/602,835

(22) Filed: Jun. 24, 2003

(65) Prior Publication Data

US 2004/0164858 A1 Aug. 26, 2004

Related U.S. Application Data

(60) Provisional application No. 60/450,253, filed on Feb. 26, 2003.

(51) Int. Cl.
   *G08B 23/00* (2006.01)
(52) U.S. Cl. ............... 340/573.1; 340/571; 340/572.2; 342/357.06; 342/357.07; 348/169; 382/103
(58) Field of Classification Search ............ 340/573.1, 340/571, 572.2, 551–556, 565; 382/103, 382/154; 348/169; 342/357.06, 357.07, 342/357.13
   See application file for complete search history.

(56) References Cited

U.S. PATENT DOCUMENTS

| | | | |
|---|---|---|---|
| 5,801,618 A * | 9/1998 | Jenkins ............ | 340/426.14 |
| 6,079,862 A * | 6/2000 | Kawashima et al. ... | 382/103 |
| 6,154,139 A | 11/2000 | Heller | |
| 6,204,813 B1 * | 3/2001 | Wadell et al. ......... | 342/463 |
| 6,353,406 B1 * | 3/2002 | Lanzl et al. ......... | 342/118 |
| 6,486,769 B1 | 11/2002 | McLean | |
| 6,567,005 B1 * | 5/2003 | Curwen et al. ........ | 340/573.4 |
| 6,671,390 B1 * | 12/2003 | Barbour et al. ........ | 382/103 |
| 6,778,171 B1 * | 8/2004 | Kikinis ................ | 345/419 |
| 6,791,603 B1 * | 9/2004 | Lazo et al. ............ | 348/169 |
| 2002/0070862 A1 | 6/2002 | Francis et al. | |

OTHER PUBLICATIONS

Tsai, R. Y. A Versatile Camera Calibration Technique for High-Accuracy 3D Machine Vision Metrology Using Off-The-Shelf TV Cameras and Lenses, IEEE Trans, Robotics and Automation (3), No. 4, 1987, pp. 323-344.

* cited by examiner

Primary Examiner—Davetta W. Goins
(74) Attorney, Agent, or Firm—Robert M. McDermott, Esq.

(57) ABSTRACT

A video surveillance system is integrated with an RFID tracking system. The calibration of the RFID tracking system is enhanced by using information provided by the video surveillance system. Optionally, the calibration of the video surveillance system may be enhanced by using information provided by the RFID tracking system. Calibration of the RFID tracking system is facilitated by placing RFID tags at visually apparent locations in a surveillance area and using the location information determined from the video surveillance system to determine appropriate correction factors for use in subsequent RFID location determinations. Dynamic performance is also calibrated by placing RFID tags on visually apparent moving targets and using the location information determined from the video surveillance system to determine the parameters used to qualify subsequent RFID location estimates of moving targets.

27 Claims, 1 Drawing Sheet

INTEGRATED RFID AND VIDEO TRACKING SYSTEM

This application claims the benefit of U.S. Provisional Patent Application 60/450,253, filed 26 Feb. 2003.

BACKGROUND OF THE INVENTION

1. Field of the Invention

This invention relates to the field of surveillance systems, and in particular to a system that includes both RFID and Video tracking capabilities. Of particular note, this invention addresses the joint calibration of such systems and the subsequent application of this calibration in tracking objects in a surveillance area.

2. Description of Related Art

The use of video cameras for tracking objects in a surveillance area is common in the art. The "actual" location of an object (also commonly referred to as the "real-world" coordinates of the object, the "physical" location of the object, the "3-D" coordinates of the object, and so on) is determined from the appearance of the object in the field of view of one or more cameras based on a "calibration" of the one or more cameras with respect to the physical environment. "A Versatile Camera Calibration Technique for High-Accuracy 3D Machine Vision Metrology Using Off-the-Shelf TV Cameras and Lenses" by R. Y. Tsai, published in the IEEE Transactions on Robotics and Automation (3), No. 4, 1987, at pages 323–344 discloses a complete camera calibration procedure based on a set of corresponding points in a physical environment and the image of the environment in the camera's field of view.

Camera location determining systems have a number of limitations, particularly in a complex physical environment that limits the fields of view of the video cameras, or limits the particular placement of each video camera. Directions to the left, right, up, and down relative to the orientation of the camera are apparent from the camera image, but the range or distance from the camera requires a determination based on other parameters, such as the apparent size of the object in the image. Additionally, camera location determining systems require a line-of-sight view of each tracked object.

Radio frequency identification (RFID) tags are also commonly used to track objects in a surveillance area. The RFID tag typically comprises a transponder that receives RF energy from a transmitter and responds with an identification signal, using the received RF energy to provide the response. By placing multiple receivers throughout the surveillance area, radio direction-finding techniques can be employed to determine the location of each RFID tag as it traverses the surveillance area. For the purposes of this disclosure, the terms RFID and RFID tag are used herein to include any emitter of RF energy that is tracked by an RF-based surveillance system. U.S. Pat. No. 6,154,139, "METHOD AND SYSTEM FOR LOCATING SUBJECTS WITHIN A TRACKING ENVIRONMENT", issued 28 Nov. 2000 to Alan C. Heller, and incorporated by reference herein, discloses a locating and tracking system that uses both RFID and infrared emissions to locate tracked objects.

RFID location determining systems have a number of limitations, particularly if the RFID tag is moving during the location determining process. Generally, the location determining process is based on the time of arrival of the response signal from the tag at each receiver, assuming an ideal straight-line path between the tag and each receiver. Physical structures, noise and reflection sources, and other factors, will each affect either the actual time of arrival of the response signal, or the accuracy of determining the time of arrival of the response signal at each receiver. Further, when the tag is moving, its reported location will lag its current location, and the amount of lag will be dependent upon the time required to read and process the tag information or otherwise identify the RF transmission. This reading and processing time may vary with the speed of movement of the RFID tag, with the number of other RFID tags being concurrently processed, and so on.

BRIEF SUMMARY OF THE INVENTION

It is an object of this invention to combine the advantages provided by a video tracking system and an RFID tracking system to overcome the limitations of either system, or both. It is a further object of this invention to improve the accuracy of an RFID location determination system based on information provided by a video location determination system. It is a further object of this invention to improve the accuracy of a video location determination system based on information provided by an RFID location determination system.

These objects and others are achieved by integrating a video surveillance system with an RFID tracking system. The calibration of the RFID tracking system is enhanced by using information provided by the video surveillance system. Optionally, the calibration of the video surveillance system may be enhanced by using information provided by the RFID tracking system. Calibration of the RFID tracking system is facilitated by placing RFID tags at visually apparent locations in a surveillance area and using the location information determined from the video surveillance system to determine appropriate correction factors for use in subsequent RFID location determinations. Dynamic performance is also calibrated by placing RFID tags on visually apparent moving targets and using the location information determined from the video surveillance system to determine the parameters used to qualify subsequent RFID location estimates of moving targets.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
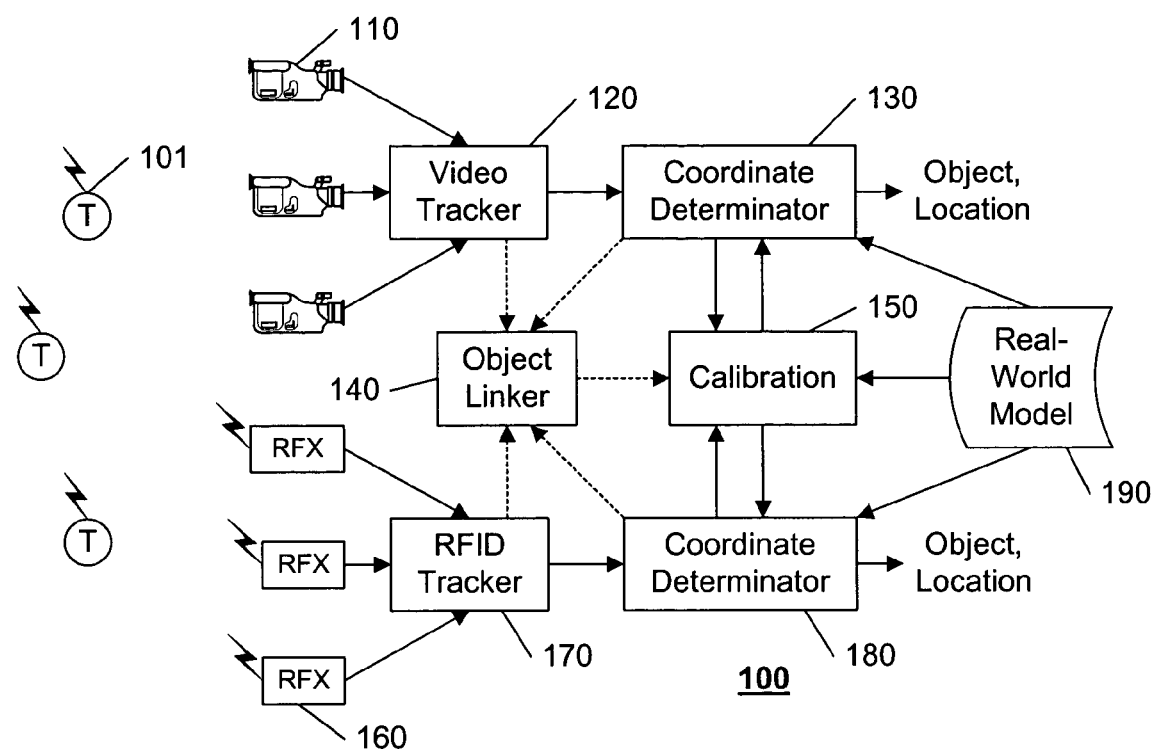
FIG. 1 illustrates an example integrated RFID and video surveillance system in accordance with this invention.

FIG. 1 illustrates an example integrated RFID and video surveillance system 100 in accordance with this invention.

The system 100 includes one or more cameras 110 that are coupled to a video tracking subsystem 120 for tracking objects that appear in the video scenes provided by the cameras 110. To facilitate reporting functions, the subsystem 120 is coupled to, or includes, a coordinate determinator 130 that maps the location of objects in the video scenes to "real-world" coordinates. These may be true real world coordinates, such as latitude, longitude, and altitude, or they may be coordinates relative to the particular surveillance area, or relative to an artificial field of reference, and so on; their main function being to convey information that can be used to identify where the object is actually located in the physical surveillance area. Typically, the coordinate determination is based on a real-world model 190, which may be explicit, such as a floor-plan of the surveillance area, or implicit, such as an implicit model of the world as a globe with latitude and longitude lines.

The camera 110, tracker 120, and coordinate determinator 130 are common in the art of video surveillance. Generally, the location and orientation of each camera 110 is known, as are the relevant parameters, such as the zoom factor, that determine each camera's field of view. The tracker 120 identifies objects within scenes based on a variety of visual features, such as a group of pixels having a particular aspect ratio moving as a contiguous group, a group of pixels corresponding to the color and composition of a typical face, a group of pixels corresponding to the structure of lines or corners of an object, and so on. The tracker 120 communicates the location of each identified object within a scene to the coordinate determinator 130, as well as other pertinent information, such as the apparent distance of the object from the camera, or information that will facilitate a determination of this distance. The tracker 120 may also integrate information related to the appearance of the same object in scenes from multiple cameras 110. Based on the known camera locations and fields of view, and the information provided by the tracker 120, the coordinate determinator 130 estimates the real world coordinates of the object.

The system 100 also includes multiple RFID receivers 160 that are coupled to an RFID tracking subsystem 170 for tracking RFID tags 101 that emit RF energy that is received by the receivers 160. Preferably, each RFID tag 101 includes a unique identifier in the emitted RF energy, to facilitate distinguishing among multiple tags 101, but alternative techniques are common in the art for distinguishing among multiple RF transmitters in a radio direction-finding application. As in the video surveillance system, to facilitate reporting functions, the tracking subsystem 170 is coupled to, or includes, a coordinate determinator 180 that maps the location of the identified transmitters to the aforementioned "real-world" coordinates.

The receiver 160, tracker 170, and coordinate determinator 180 are common in the art of RF location determination. Generally, the location of each receiver 160 is known, and each receiver 160 is synchronized to a common clock. When an RFID tag 101 transmits, each receiver 160 that receives the transmission records the time of arrival of the signal and reports the event to the tracker 170. The tracker 170 associates the reported times of receipt from each receiver 160 to a common transmitter, using the aforementioned unique ID contained in the transmission, or other RF identification technique, and reports this information to the coordinate determinator 180. The difference between the times of receipt of a common transmission at two receivers defines a loci of points between the known location of the two receivers at which the transmitter must lie, assuming an ideal RF environment and ideal synchronization. The difference among the times of receipt at three receivers (a, b, c) defines a loci of points between each of the three pairs of receivers (a–b, a–c, b–c), and the intersection of the three loci uniquely defines the location of the transmitter, again assuming an ideal RF environment and ideal synchronization. In a non-ideal environment, the three loci do not intersect at a common point, but rather, the intersection forms a triangle within which the transmitter is likely to be located. Additional receivers and/or additional receptions of transmissions from the same transmitter serve to reduce the area of location uncertainty. The coordinate determinator 180 estimates the most likely location of the RFID tag 101 and reports this location in real-world coordinates, often with a "quality-factor" or other reliability measure, based on the size of the area of location uncertainty. Other techniques of RF location-determination, or combinations of techniques, may also be employed, including radio direction-finding techniques and others, common in the art.

In accordance with one aspect of this invention, the trackers 120, 170 are coupled together via an object linker 140 that links video objects identified by the video tracker 120 with RFID tags identified by the RFID tracker 170, thereby associating the coordinates provided by the coordinate determinators 120 and 180. This object linking generally includes providing the RFID tag 101 in a visually identifiable form, or attaching the RFID tag 101 to a visually apparent object. Manual intervention is typically used to facilitate the linking of the visual object and the RF emitter, but automated techniques may also be employed to effect this linking. In a straightforward embodiment that uses manual input, the linker 140 presents the detected RFID objects and the detected visual objects, and a user associates each RFID object to each corresponding visual object. In an automated embodiment, the RFID tag has a recognizable appearance to the video tracker 120, and the tracker 120 or the coordinate determinator 130 reports the appearance of each RFID tag to the linker 140. In response, the linker 140 associates this visual RFID object to the nearest RFID tag reported by the RFID tracker 170 or the RFID coordinate determinator 180.

Ideally, the coordinates determined by the video coordinate determinator 130 and the RFID coordinate determinator 180 for a commonly linked visually-detected and RF-detected RFID object will be identical. A difference between the reported coordinates indicates an error in either the video system or the RFID system, or both. As is known in the art, errors may be associated with a bias in one or more of the components that affects the accuracy of the determined location, or with a variance in the reported data caused by noise or other factors that affect the precision, or region of uncertainty, about the determined location, or both.

In accordance with another aspect of this invention, a calibration module 150 is provided to reduce the errors in the reported coordinates in either or both the video and RFID systems. Typically, a video coordinate determination system is more accurate than an RFID coordinate determination system, as long as the target is within the camera's field of view, and the calibration module 150 is configured to determine correction factors that are applied to the RFID coordinate determinator 180 to provide a correspondence between the coordinates reported by the RFID system and the coordinates reported by the video system. One of ordinary skill in the art will recognize, however, that the calibration can be applied to either system, or both, depending upon the particular reliance associated with coordinates from each system. Additionally, if the "true" location of the object is known, for example, by attaching the RFID tag to a known reference point in the surveillance area, the calibration system is configured to reduce the errors of both systems relative to the true location.

Any of a variety of techniques may be employed to improve the accuracy and/or precision of one location determination system based on the coordinates provided by another system. Typically, both static and dynamic correction schemes are used, wherein static correction applies to corrections used to compensate for errors that are endemic to the system, regardless of the particular target object, and dynamic correction applies to corrections used to compensate for errors introduced by the dynamic characteristics of the target object or the environment, such as movement of the target object, multiple objects within range of the receivers in the surveillance area, and so on.

As a simple example of static correction, if the RFID coordinate determinator 180 consistently reports a coordinate to the left of the coordinate provided by the video coordinate determinator 130, and the video coordinates are presumed to be accurate, the calibration module 150 provides a correction factor to the coordinate determinator 180 to bias the reported coordinates to the right, to move the RFID reported coordinates closer to the presumably accurate video reported coordinates. In like manner, as a simple example of dynamic correction, if the processing of the RFID coordinates lags the video processing by N video frames, the association between reported coordinates can be offset by N frames, so that the reported location of a moving object from both systems will be based on a common time reference.

Generally, static errors are related to the particular placement of the receivers 160 in the environment, and, in a preferred embodiment, the corrections are dependent upon each receiver 160. As noted above, the coordinate determinator 180 determines the possible transmitter location based on the 'known' location of the receivers and the time of arrival of a signal from the transmitter at each receiver. Static RF direction finding calibration techniques are common in the art, and generally include either correction to the raw data that is reported by each receiver 160, or correction to the placement information associated with each receiver 160. A fixed correction to the time of arrival measure from each receiver 160 corrects for inaccuracies in the synchronization of each receiver to a common time reference, as might be caused, for example, by component variations among receivers, variations in the synchronization signal path to each receiver, and so on.

A correction to the location of each receiver 160 primarily addresses inaccuracies introduced by asymmetric RF reception, typically caused by the presence of obstructions in the transmitted signal's path to the receiver. That is, if the signal path of a signal arriving from the left of the receiver is longer than that of signals arriving from the right of the receiver, accuracy can be improved by defining the 'virtual' location of the receiver to be to the right of its actual location, and basing the coordinate determination on this virtual location. Generally, a least-squares error technique is applied to determine the 'virtual' location of each receiver 160 by determining a location of the receiver that minimizes the square of the vector differences between the reported coordinates from the video-system and the RFID-system for each linked RFID tag object.

Additional correction factors may be used, as well. For example, the receivers 160 may be configured to also provide a measure of the signal strength associated with each reception. This signal strength measure may be used by the calibration module 150 to facilitate the determination of the area of uncertainty associated with each coordinate determination, by associating less uncertainty to reports with strong signal strengths. In like manner, the signal strength measure, or the absence of a reception report from a receiver, can be used to identify 'dead zones' associated with the placement of that receiver.

One of ordinary skill in the art will recognize that other calibration techniques may be employed, particularly those available from the realm of "machine-learning". A neural network, for example, could be created wherein the inputs to the neural network are the raw data from the receivers 160 and their locations, and the output is a determined coordinate. In a 'learning-mode', the nodes within the neural network are suitably configured to minimize a difference from the output of the neural network and the coordinates from the video coordinate determinator 130. In like manner, a rules-based system can be developed to incorporate alignment rules that serve to minimize the difference between the video-determined object location and RFID-determined object location, based on prior-reported coordinates from the video and RFID systems.

In accordance with another aspect of this invention, parameters for dynamic correction are obtained by placing the RFID tags on moving objects and determining the differences in the reported locations of each tag from each of the video and RFID tracking systems. As noted above, the coordinates of a moving RFID tag from the RFID tracking system are likely to lag the visible location of the RFID tag in the camera images, and the calibration module 150 is configured to apply suitable adjustments to synchronize the reported coordinates from each determinator 130, 180 to the images from the camera. Because the coordinate determinator 130 receives frame-dependent information, the association of a video-determined coordinate to a particular real-time camera image is straightforward. However, the association of an RFID-determined coordinate to a particular real-time reference, such as a time-changing image of a scene, is less immediate. If the clocks of the video system and the RFID system are synchronized to a common time reference, then the reported times of arrival of the RFID signals can be used to determine the video frame corresponding to the arrival of these signals. Alternatively, a correlation between the times of arrival and the video frames can be heuristically determined, based on the reported coordinates from each system while the moving RFID tags are visually tracked by the video system.

In like manner, the accuracy and lag in reporting the location of an RFID tag can be expected to increase as the number of other RFID tags being concurrently processed increases. Particularly, as multiple transmissions from RFID tags arrive at each receiver, the determined time of arrival of each signal can be expected to vary, and/or some simultaneously arriving signals will be missed by one or more of the receivers. The variance in accurately recording the time of arrival of each signal will affect the accuracy of the determined location, and a reduction in the number of receivers that report receipt of the signal will reduce the precision of the determined location, or if fewer than three receivers report receipt, will preclude a location determination. In accordance with another aspect of this invention, the area of uncertainty associated with a determined coordinate is also dependent on the number of transmitters 101 in the vicinity of each receiver 160. Preferably, a correlation between the number of concurrent transmitters 101 and location determination error is determined heuristically, by staging different numbers of transmitters at known or visually determinable locations and determining the accuracy and variance in the RFID determined locations.

In accordance with another aspect of this invention, the calibration module 150 is also configured to facilitate a determination of a video-determined coordinate or an RF-determined coordinate when one or both of the object trackers 120, 170 are unable to locate the object, due to temporary obstruction of the visual or RF signals from the RFID tag device. If, for example, the object is occluded from camera view by an obstruction, the post-calibration RF-determined location can be provided as the estimated object coordinate from the coordinate determinator 130. If both the visual and RF signals are temporarily absent, the calibration module 150, and/or each of the coordinate determinators 130, 180, provides an estimate of the object's location, based on the predicted path of the object, using techniques common in the art.

One of ordinary skill in the art will recognize that the principles of this invention can be applied in an iterative manner to progressively improve the accuracy of the system. For example, an RFID transmitter 101 could be attached to each camera 110, and/or each receiver 160 could be visually identifiable in one or more of the camera's 110 field of view. In this embodiment, the system could be configured to modify the assumed/known location of each receiver 160 or camera 110 based on a location-determination provided by the video and/or RF location determination systems, using, for example, a least-square-error minimization technique, or other closed-loop calibration schemes.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the integration of the video and RF surveillance systems can be provided during an initial calibration stage of the deployment of the surveillance system, and one of the systems can be removed after this calibration stage. That is, the video cameras 110 could be temporarily deployed in a surveillance area when an RFID system is being installed, and subsequently removed after the RFID system is suitably calibrated. In like manner, an RFID system can be temporarily deployed in a video surveillance system to facilitate the calibration of the video system, and then removed. These and other system configuration and optimization features will be evident to one of ordinary skill in the art in view of this disclosure, and are included within the scope of the following claims.

I claim:

1. A surveillance system comprising:
a video surveillance system that identifies a visual-object based on image information provided by one or more cameras,
an RF surveillance system that identifies an RF-object based on reception information provided by a plurality of receivers, and
an object linker, operably coupled to the video surveillance system and the RF surveillance system, that is configured to link the visual-object to the RF-object,
wherein:
the video surveillance system is configured to determine a first location coordinate corresponding to the visual-object, and
the RF surveillance system is configured to determine a second location coordinate corresponding to the RF-object, and
the surveillance system further includes:
a calibration module, operably coupled to the video surveillance system and the RF surveillance system that is configured to facilitate a reduction in a difference between the first location coordinate and the second location coordinate.

2. The surveillance system of claim 1, wherein
the RF surveillance system determines the second location coordinate based on a time-or-arrival parameter provided by each of the plurality of receivers, and
the calibration module is configured to provide an adjustment to the time-of-arrival parameter from one or more of the plurality of receivers.

3. The surveillance system of claim 2, wherein
the RF surveillance system determines the second location coordinate based on a predefined location of each of the plurality of receivers, and
the calibration module is configured to provide an adjustment to the predefined location of one or more of the plurality of receivers.

4. The surveillance system of claim 1, wherein
the RF surveillance system determines the second location coordinate based on a predefined location of each of the plurality of receivers, and
the calibration module is configured to provide an adjustment to the predefined location of one or more of the plurality of receivers.

5. The surveillance system of claim 1, wherein
the RF surveillance system determines the second location coordinate based on trajectory parameters associated with the RF-object, and
the calibration module is configured to provide an adjustment to one or more of the trajectory parameters.

6. The surveillance system of claim 5, wherein
the trajectory parameters include a latency parameter that corresponds to a delay associated with processing the receipt information to provide the second location coordinate.

7. The surveillance system of claim 1, wherein
the calibration module is configured to provide one or more adjustment parameters that facilitate the reduction of the difference based on a calibration of the surveillance system that includes placement of a plurality of RF-objects at visibly identifiable locations.

8. The surveillance system of claim 1, wherein
the calibration module is configured to provide one or more adjustment parameters that facilitate the reduction of the difference based on a calibration of the surveillance system that includes placement of a plurality of RF-objects upon movable visibly identifiable objects.

9. The surveillance system of claim 1, wherein
the calibration module is configured to facilitate a determination of the first location coordinate from the video surveillance system based on the second location coordinate, when the visual-object is occluded from view of the one or more cameras.

10. A method of calibrating an RF location determination system in a surveillance area, comprising:
attaching an RFID tag to a visually identifiable object,
determining a first location coordinate of the object based on an appearance of the object in a scene provided by a video camera,
obtaining reception information from a plurality of receivers in response to a transmission from the RFID tag,
determining a second location coordinate of the object based on the reception information from the plurality of receivers,
determining one or more adjustment parameters that facilitate a reduction in a difference between the first and second location coordinates of the object.

11. The method of claim 10, further including:
determining a correspondence between the appearance of the object and the reception information to link the visually identifiable object to the RFID tag.

12. The method of claim 10, wherein
at least one of the one or more adjustment parameters is configured to be applied to the second location coordinate.

13. The method of claim 10, wherein
the reception information includes a time-of-arrival parameter provided by each of the plurality of receivers, and
at least one of the one or more adjustment parameters is configured to be applied to the time-of-arrival parameter of at least one of the plurality of receivers.

14. The method of claim 10, wherein
determining the second location coordinate is also based on a defined location of each of the plurality of receivers, and
at least one of the one or more adjustment parameters is configured to be applied to the defined location of at least one of the plurality of receivers.

15. The method of claim 10, wherein
at least one of the one or more adjustment parameters is configured to provide a correspondence in time of the first location coordinate and the second location coordinate.

16. The method of claim 10, further including:
moving the object through the surveillance area,
determining a plurality of video location coordinates and a plurality of RF location coordinates of the object, and
determining trajectory adjustment parameters to be applied to subsequent location determinations, based on differences between the plurality of video location coordinates and the plurality of RF location coordinates of the object.

17. The method of claim 10, further including
activating multiple other RF transmitters concurrently with the transmission from the RFID tag,
determining congestion adjustment parameters to be applied to subsequent reception information from at least one of the plurality of receivers, based on a difference between the first and second location coordinates of the object.

18. A method of determining a location coordinate of an RF transmitter, comprising:
receiving a signal from the RF transmitter at a plurality of receivers, and
determining the location coordinate of the RF transmitter based on reception information from the plurality of receivers and based on adjustment parameters,
wherein:
the adjustment parameters are based on one or more differences between first location determinations and second location determination of a target transmitter,
the first location determinations are based on visual images of the target transmitter, and
the second location determinations are based on prior reception information from the plurality of receivers corresponding to transmissions from the target transmitter.

19. The method of claim 18, wherein
the reception information includes a time-of-arrival parameter provided by each of the plurality of receivers, and
at least one of the adjustment parameters is configured to be applied to the time-of-arrival parameter of at least one of the plurality of receivers.

20. The method of claim 18, wherein
determining the location coordinate is also based on a defined location of each of the plurality of receivers, and
at least one of the adjustment parameters is configured to be applied to the defined location of at least one of the plurality of receivers.

21. The method of claim 18, further including
displaying an image of an object that includes the RF transmitter, and
wherein
at least one of the adjustment parameters is configured to provide a correspondence in time between receiving the signal from the RF transmitter and displaying the image of the object that includes the RF transmitter.

22. The method of claim 18, wherein
at least one of the adjustment parameters is dependent upon a speed of motion of the RF transmitter.

23. The method of claim 18, further including
receiving other signals from a number of other RF transmitters,
wherein
at least one of the adjustment parameters is dependent upon the number of other RF transmitters.

24. The method of claim 18, further including
determining an area of uncertainty associated with the location determination, based on variance parameters,
wherein
the variance parameters are also based on the one or more differences between the first location determinations and the second location determination of the target transmitter.

25. The method of claim 24, wherein
at least one of the variance parameters is dependent upon a speed of motion of the RF transmitter.

26. The method of claim 24, further including
receiving other signals from a number of other RF transmitters,
wherein
at least one of the variance parameters is dependent upon the number of other RF transmitters.

27. The method of claim 24, wherein
at least one of the variance parameters is dependent upon a strength of the signal from the RF transmitter at each of the plurality of receivers.

* * * * *

UNITED STATES PATENT AND TRADEMARK OFFICE
CERTIFICATE OF CORRECTION

PATENT NO.         : 6,998,987 B2                                                            Page 1 of 1
APPLICATION NO. : 10/602835
DATED              : February 14, 2006
INVENTOR(S)        : Yun-Ting Lin It is certified that error appears in the above-identified patent and that said Letters Patent is hereby corrected as shown below:

After column 1, line 6, please insert:

GOVERNMENT INTEREST

This invention was made with Unites States Government support under cooperative agreement number 70NANB3H3049 awarded by the National Institute of Standards and Technology (NIST). The United States Govenrment has certain rights in the invention.

Signed and Sealed this

Twelfth Day of December, 2006

JON W. DUDAS
*Director of the United States Patent and Trademark Office*